United States Patent [19]

Honda

[11] Patent Number: 4,830,401
[45] Date of Patent: May 16, 1989

[54] AIR BAG ASSEMBLY FOR RESTRAINING VEHICLE OCCUPANT

[75] Inventor: Kiyoshi Honda, Wako, Japan

[73] Assignee: Honda Giken Kogyo Kabushiki Kaisha, Tokyo, Japan

[21] Appl. No.: 152,268

[22] Filed: Feb. 4, 1988

[30] Foreign Application Priority Data

Feb. 5, 1987 [JP] Japan .................. 62-14959

[51] Int. Cl.⁴ .................................. B60R 21/26
[52] U.S. Cl. ........................ 280/736; 280/743
[58] Field of Search ............... 280/728, 729, 743, 734, 280/736, 741, 742

[56] References Cited

U.S. PATENT DOCUMENTS

| | | | |
|---|---|---|---|
| 3,451,694 | 6/1969 | Hass ..................... | 280/743 |
| 3,843,151 | 10/1974 | Lewis ..................... | 280/736 |
| 3,879,056 | 4/1975 | Kawashimi et al. ............. | 280/743 |
| 4,183,550 | 1/1980 | Sudou ..................... | 280/743 |

FOREIGN PATENT DOCUMENTS 3604843 8/1987 Fed. Rep. of Germany ...... 280/736

*Primary Examiner*—Charles A. Marmor
*Assistant Examiner*—Karin Tyson
*Attorney, Agent, or Firm*—Armstrong, Nikaido, Marmelstein, Kubovcik & Murray

[57] ABSTRACT

A bag of an air bag assembly is fixed at a base portion thereof to a gas generator in such a manner as to enclose openings which are formed in the latter, the bag being inflated by gas which jets out through the openings perpendicularly to a direction intending toward an occupant. A self-sustained reinforcing member is mounted on the base portion of the bag and provided with a surface which faces the openings of the gas generator. Gas rushing out through the openings is intercepted and redirected toward the occupant by the surface of the reinforcing member. A space for heat insulation is defined between the outer periphery of the reinforcing member and the inner periphery of the bag.

3 Claims, 3 Drawing Sheets

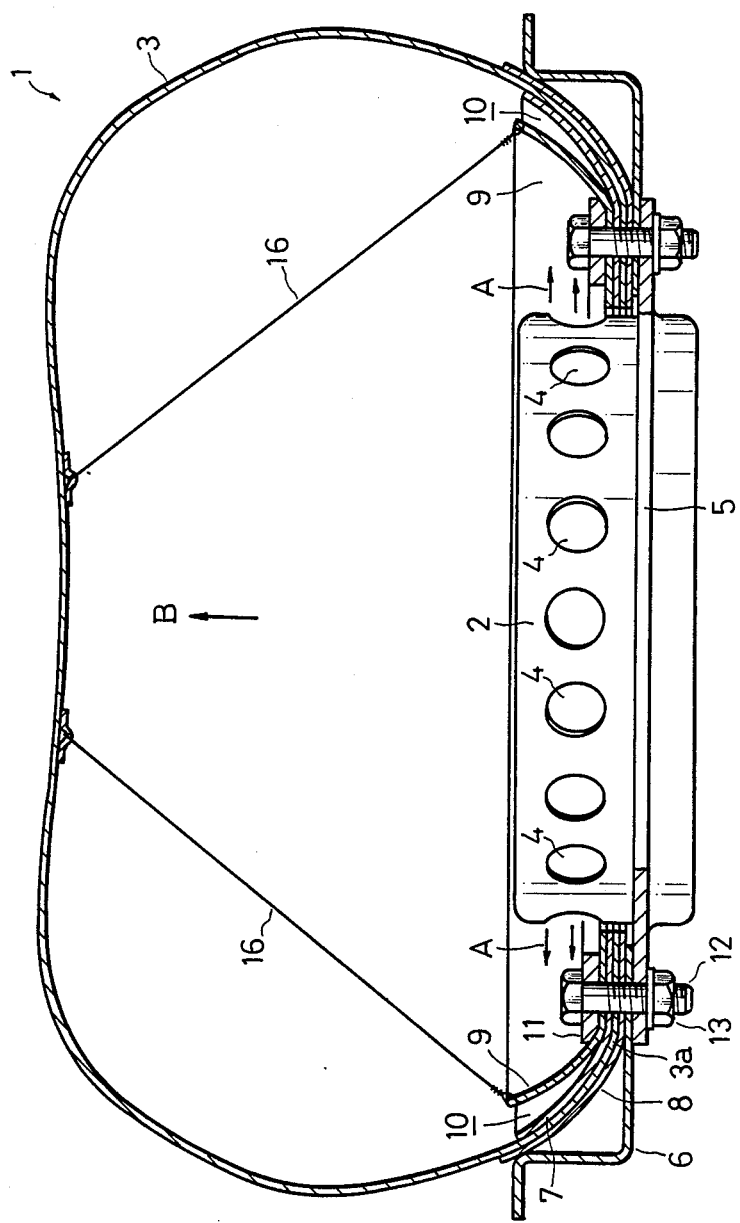

AIR BAG ASSEMBLY FOR RESTRAINING VEHICLE OCCUPANT

BACKGROUND OF THE INVENTION

The present invention relates to an air bag assembly installed in a vehicle for restraining an occupant from forward movement in the event of collision of the vehicle, and including a gas generator for generating gas and a bag to be inflated by the gas. More particularly, the present invention is concerned with an air bag assembly of the type directing gas jetting out of the gas generator in a direction perpendicular to a direction which extends toward an occupant.

Various kinds of devices have heretofore been proposed for protecting an occupant of a vehicle against injury by physically restraining the occupant's body when the vehicle encounters a collision. An air bag assembly which belongs to a family of such devices is generally made up of a sensor responsive to decelerations of the vehicle greater than a predetermined deceleration, a gas generator for generating gas, and a bag connected at its base portion to the gas generator to be inflated by the gas. When the sensor senses a deceleration greater than the predetermined deceleration, a gas generating agent confined in the gas generator is fired to generate gas so as to inflate the bag. Such an air bag assembly may be positioned at, for example, a central part of a steering wheel or a lower part of an instrument panel to protect an occupant of a front seat or at the back of the seat back of a front seat to protect an occupant of a rear sheet. In the event of collision, the bag is inflated toward the occupant to restrain him or her from forward movement.

In the air bag assembly, should the gas jetting out from the gas generator be directed toward the operator, the bag would be rapidly inflated toward the occupant applying an intense impact to the occupant whose body tends to move forward by inertia. In light of this, it has been customary to form openings through a side or circumferential wall of a gas generator, so that gas may be blown off perpendicularly to the direction extending toward an occupant. Such a configuration is shown in Japanese Patent Publication No. 53-21779 and others. Specifically, in such a configuration, the bag is inflated sideways first freeing an occupant from a critical degree of impact.

A problem with the above-stated configuration is that the gas jetting out of the gas generator directly impinges on the base portion of the bag and, in addition, the temperature of the gas just blown off is extremely high due to the explosion of the gas generating agent. The high temperature gas hits against the base portion of the bag directly and continuously.

The bag of such an air bag assembly is usually constructed with a fabric which is coated or impregnated with rubber or synthetic resin for guaranteeing softness and air-tightness. The strength of such bag, is reduced by the hot gas which continuously impinges against the bag. Moreover, the base portion of the bag, directly affected by the hot gas is the portion which develops a considerable degree of stress when the bag is inflated. Because the pressure inside the bag is elevated when the occupant's body collides against the bag being inflated, a considerable stress is developed in the base portion. Hence, as the strength of the base portion of the bag is lowered by the hot gas, the occupant's body colliding against the bag is apt to blow a hole through the base portion or even tear it up.

To accommodate such a stress, there has been proposed to use a reinforcing member formed of cloth or the like, such as disclosed in, for example, Japanese Laid-Open Utility Model Publication (Kokai) No. 52-119234. Such reinforcing member, however, cannot cope with the hot gas satisfactorily partly because it is made of the same material as the bag and partly because it is simply put on and joined with the base portion of the bag.

SUMMARY OF THE INVENTION

It is, therefore, an object of the present invention to provide an air bag assembly in which the base portion of a bag is fully protected against the heat of gas even if the assembly is of the type jetting gas in a direction perpendicular to a direction extending toward an occupant.

It is another object of the present invention to provide an air bag assembly in which a peripheral part of a bag is inflated before the inflation of the remaining part to restrain an occupant in such a manner as to wrap around the occupant.

It is another object of the present invention to provide an advantageous implementation for fixing cords which are adapted to regulate the shape of a bag of an air bag assembly when the latter is inflated.

An air bag assembly of the present invention includes a self-sustained reinforcing member disposed inside of a base portion of a bag and configured such that hot gas jetting sideways from a gas generator directly dashes against the base portion and is redirected by the base position toward an occupant. The reinforcing member defines a space in cooperation with the base portion of the bag. In this configuration, the gas from the gas generator is directed toward the reinforcing member and, then, redirected toward an occupant, i.e., it is prevented from directly hitting against the base portion of the bag. Further, the space defined between the reinforcing member and the bag offers a heat insulating effect which reduces thermal influence of the gas on the bag. Since the reinforcing member is located in the bag, it does not affect the air-tightness of the bag even if a hole is formed in the reinforcing member by the hot gas.

The gas jetting sideways allows a peripheral part of the bag to inflate toward the occupant before the other part is inflated because the gas is redirected toward the occupant by the reinforcing member. The occupant, therefore, is safely restrained by the inflating bag the bag wraps around the occupant.

The reinforcing member may be made of an elastic material. An elastic material not only allows the bag to be folded in a compact configuration but also facilitates inflation of the bag due to its elastic restoration.

In the case that cords are used for defining the shape of the bag in an inflated position, the cords can be readily fixed by anchoring one end of each cord to the reinforcing member which is accommodated in the bag.

In accordance with the present invention, in an air bag assembly for restraining an occupant of a vehicle and including a gas generator for generating gas and jetting the gas in a direction perpendicular to a direction extending toward the occupant through openings formed in the gas generator, and a bag connected to the gas generator at a base portion of the bag in such a manner as to enclose the openings and inflatable by the gas, there is included a self-sustained reinforcing member disposed inside of the base portion of the bag and shaped such that the gas jetting out from the gas generator directly hits against the reinforcing member and is then redirected toward the occupant by the reinforcing member. The reinforcing member cooperates with the base portion of the bag to define a space therebetween.

BRIEF DESCRIPTION OF THE DRAWINGS

The above and other objects, features and advantages of the present invention will become more apparent from the following detailed description taken with the accompanying drawings in which:

FIG. 3 is a view similar to FIG. 1, showing another embodiment of the present invention.

DESCRIPTION OF THE PREFERRED EMBODIMENTS

Figure 1:
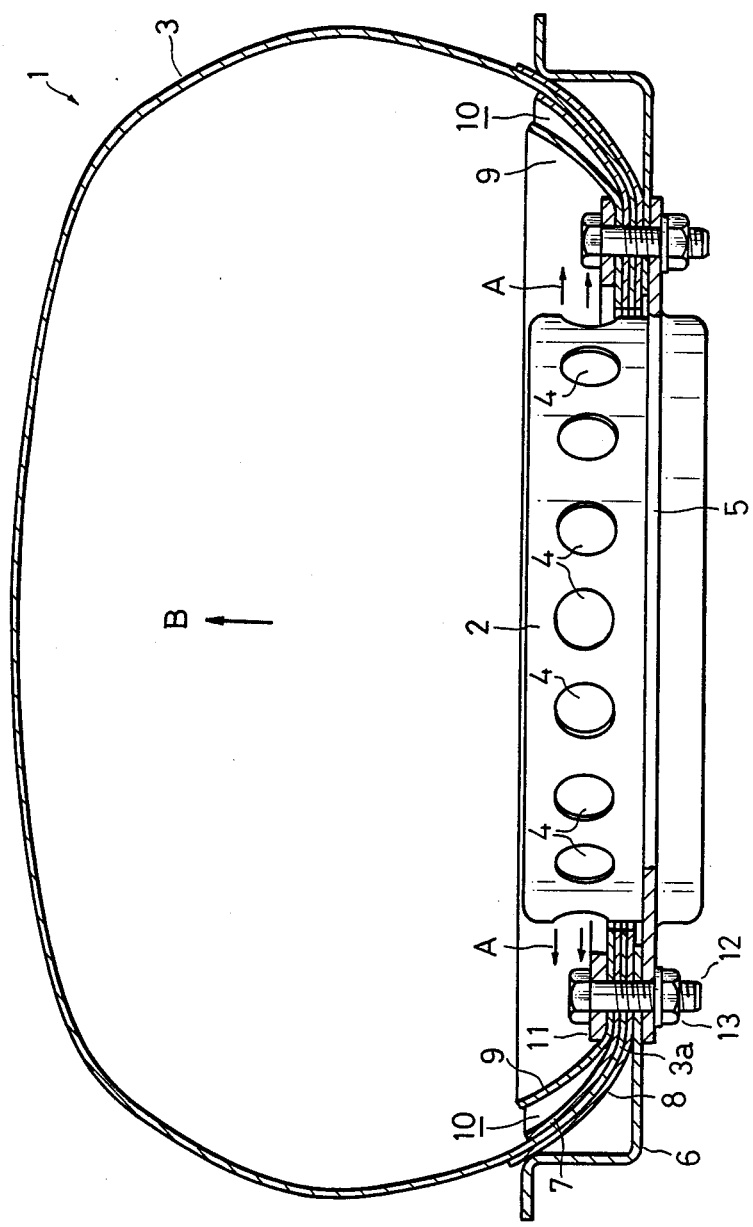
FIG. 1 is a section showing an air bag assembly embodying the present invention with a bag thereof held in an inflated position.

Referring to FIG. 1 of the drawings, an air bag assembly embodying the present invention is shown and generally designated by the reference numeral 1. As shown, the assembly 1 includes a gas generator 2 and an inflatable bag 3. The gas generator 2 comprises a thin cylindrical container in which a gas generating agent is confined. A plurality of openings 4 are formed in the cylindrical side wall of the gas generator 2 at suitably spaced locations along the circumference of the latter. In this configuration, when the gas generator 2 is triggered to fire the gas generating agent, the resulting gas jets out through the openings 4 in those directions which are perpendicular to the axis of the gas generator 2, as indicated by arrows A in the figure.

A radially outwardly extending flange 5 is provided on the circumferential wall of the gas generator 2 adjacent to the openings 4. A metal fixture 6 is rigidly mounted on the flange 5 for retaining the bag 3. Specifically, the metal fixture 6 retains a base portion 3a of the bag 3 such that the bag 3 encloses the openings 4.

The bag 3 is formed of a soft air-tight material such as a fabric which is coated with rubber or synthetic resin. Pieces of cloth 7 and 8 which may be implemented with a material similar to the bag 3 are applied to, respectively, the inner and outer surfaces of the bag base portion 3a and bonded, stitched or otherwise fixed to the latter for reinforcing purpose.

Another reinforcing member 9 is disposed inside of the bag base portion 3a and provided with a generally conical or spherical and annular configuration. Made of an elastic material, the reinforcing member 9 is fixed in place together with the bag base portion 3a along its radially inner portion so that a radially outer portion of the member 9 lifts itself between the openings 4 of the gas generator 3 and the bag base portion 3a. In this sense, the reinforcing member 9 is self-sustained. A space 10 is defined between the radially outer portion of the reinforcing member 9 and the bag base portion 3a. The member 9 has a height which is great enough to fully face the openings 4 of the gas generator 2.

The bag base portion 3a and reinforcing pieces of cloth 7 and 8 are connected air-tight to the gas generator 2 by placing the inner portion of the reinforcing member 9 on the bag base portion 3a and pieces 7 and 8, then putting them between a fixing ring 11 and the metal fixture 6, and then tightening bolts 12 and nuts 13.

Figure 2:
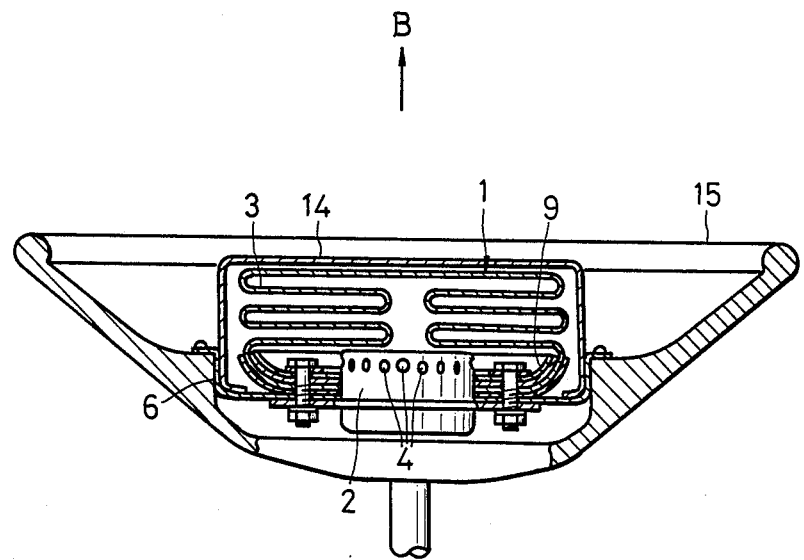
FIG. 2 is a section schematically showing a steering wheel to which the air bag assembly of FIG. 1 is mounted.

Referring to FIG. 2, the air bag assembly 1 having the above construction is received in a padding 14 with its bag 3 folded up. The reference numeral 15 designates a steering wheel of a vehicle to the central portion of which the assembly 1 is mounted. In the condition shown in FIG. 2, the axis of the gas generator 2 is directed toward an occupant, not shown, as indicated by an arrow B in the figure. Hence, the gas generated by the gas generator 2 jets out in a direction perpendicular to the direction B, i.e. direction extending toward the occupant. An arrangement is made such that the gas generating agent confined in the gas generator 2 is fired by an output signal of a collision sensor, not shown.

In operation, assume that a vehicle with the steering wheel 15 has collided against another vehicle or any obstacle. As the resulting deceleration is greater than a predetermined degree, the sensor produces an output, or collision signal, which triggers the gas generator 2. Gas generated by the gas generator 2 is blown off through the openings 4 in the directions A which are perpendicular to the direction B. Consequently, the gas hits against the self-sustained reinforcing member 9 and, then, guided by the member 9 toward the occupant, or operator, whereby the bag 3 is inflated. This allows the peripheral part of the bag 3 to be inflated before the center part and, therefore, causes the bag 3 to restrain the operator in such a manner as to tend to wrap around the occupant.

In the above condition, an intense stress which is developed in the bag base portion 3a is reduced by the reinforcing pieces of cloth 7 and 8 which are positioned in the bag base portion 3a. In addition, another reinforcing member 9 overlies that part of the bag base portion 3a which is fixed to the gas generator 2, thereby surely preventing that part of the bag base portion 3a from being torn or ruptured.

Since the hot gas jetting out of the gas generator 2 is redirected by the self-sustained reinforcing member 9 as previously stated, it is prevented from directly impinging on the bag 3 and reinforcing pieces 7 and 8. Further, the space 10 defined between the member 9 and the bag base portion 3a and pieces 7 and 8 serves to reduce the thermal influence of the gas on the bag base portion 3a by insulating the heat.

As stated above, in spite of the hot gas which continuously dashes against the gas generator 2, the bag base portion 3a is free from a decrease in strength and, therefore, from holes and tears.

The self-sustained reinforcing member 9 may suffer from a decrease in strength because the hot gas directly hits thereagainst. Nevertheless, even if the gas blows a hole through the reinforcing member 9, the function of the air bag is preserved because the member 9 is not affected by the tension of the bag 3 and others and because it, in turn, does not affect the air-tightness of the bag 3.

When the bag 3 of the air bag assembly 1 is inflated, an excessive amount of protrusion of the bag 3 toward the occupant would result in an impact acting on the operator. It is, therefore, preferable to limit the amount of protrusion to optimal one. Another embodiment of the present invention which will be described with reference to FIG. 3 is designed to meet such a demand.

In FIG. 3, cords 16 are each anchored at one end to a central part of the bag 3 and at the other end to the outer peripheral edge of the reinforcing member 9. Connecting the central part of the bag 3 to the reinforcing member 9 as stated, the cords 16 cause the bag 3 to remain in a generally flat configuration when inflated, as shown in FIG. 3. The bag 3, therefore, is capable of sustaining the front part of the occupant's bust evenly and, yet, over a wide area.

In the embodiment of FIG. 3, the self-sustained reinforcing member 9 allows the cords 16 to be fixed thereto within the bag 3. Those portions of the member 9 to which the cords 16 are fixed do not need air-tightness because, as stated earlier, the member 9 does not affect the air-tightness of the bag 3. It follows that the cords 16 may be anchored to the member 9 by the simplest possible means.

In any of the embodiments shown and described, the reinforcing member 9 may be made of a relatively hard resin or like material instead of an elastic material. The configuration of the member 9 is not limited to a cone or a sphere which has been described. The gist is that the member 9 be shaped to receive the gas jetting out from the gas generator 2 and redirect it toward a occupant.

What is claimed is:

1. An air bag assembly for restraining an occupant of a vehicle and including a gas generator for generating gas and jetting the gas in a direction perpendicular to a direction which extends toward the occupant through openings which are formed in said gas generator, and a bag connected to said gas generator at a base portion of said bag in such a manner as to enclose said openings and inflatable by the gas, said air bag assembly comprising:

a self-sustained reinforcing member disposed inside of said base portion of said bag and shaped such that the gas jetting out from said gas generator directly hits against said reinforcing member and is then redirected toward the occupant by said reinforcing member, said reinforcing member cooperating with said base portion of said bag to define a space therebetween.

2. An air bag assembly as claimed in claim 1, wherein said reinforcing member is made of an elastic material.

3. An air bag assembly as claimed in claim 1, further comprising cords for limiting the amount of protrusion of a central part of said bag toward the operator, said cords each being anchored to said reinforcing member.

* * * * *